United States Patent
Brahmbhatt et al.

(10) Patent No.: US 7,903,671 B2
(45) Date of Patent: Mar. 8, 2011

(54) SERVICE FOR NAT TRAVERSAL USING IPSEC

(75) Inventors: Deepali Apurva Brahmbhatt, San Jose, CA (US); Mark Enright, Soquel, CA (US)

(73) Assignee: Cisco Technology, Inc., San Jose, CA (US)

( * ) Notice: Subject to any disclaimer, the term of this patent is extended or adjusted under 35 U.S.C. 154(b) by 950 days.

(21) Appl. No.: 11/198,533

(22) Filed: Aug. 4, 2005

(65) Prior Publication Data

US 2007/0058644 A1   Mar. 15, 2007

(51) Int. Cl.
*H04L 12/28* (2006.01)
*H04L 12/56* (2006.01)

(52) U.S. Cl. .................... 370/401; 370/402; 370/404

(58) Field of Classification Search .................. 370/351, 370/441, 401, 402, 404
See application file for complete search history.

(56) References Cited

U.S. PATENT DOCUMENTS

| | | | |
|---|---|---|---|
| 6,870,837 B2 * | 3/2005 | Ho et al. | 370/356 |
| 6,976,176 B1 * | 12/2005 | Schier | 726/11 |
| 2003/0212907 A1 * | 11/2003 | Genty et al. | 713/201 |
| 2004/0088537 A1 | 5/2004 | Swander | |

FOREIGN PATENT DOCUMENTS

EP   1328105 A1   7/2003

OTHER PUBLICATIONS

Haluk Aydin, "NAT Traversal: Peace Agreement Between NAT and IPSEC", Aug. 12, 2001, SANS Institute 2001.
G. Montenegro, "RSIP Support to End-to-end IPsec", Oct. 2001, RFC: 3104, Copyright The Internet Society (2001).
P. Srisuresh, "Security Model with Tunnel-mode IPsec for NAT Domains", RFC:2709, Copyright The Internet Society (1999).

(Continued)

*Primary Examiner* — Daniel Wu
*Assistant Examiner* — Frederick Ott
(74) *Attorney, Agent, or Firm* — Weaver Austin Vileneuve & Sampson LLP (57) ABSTRACT

Disclosed are methods and apparatus for methods and apparatus for facilitating a secure connection between a first and a second node in a computer network where one or both of the nodes may or may not reside behind a network address translation (NAT) enabled gateway. Embodiments of the present invention provide a seamless integration by providing a uniform solution for establishing secure connections, such as IPSEC, between two nodes irrespective of whether they are behind a NAT-enabled gateway or not. In general, a gateway is operable to receive a request from a remote host for a secure connection to a local host that within the home network of the gateway. The gateway then forwards this received request to a NAT traversal service. The NAT traversal service receives the request and then automatically sends an initiation message to set up a secure session, e.g., performing authentication and exchanging keys. In a specific aspect, the setup data utilizes an IKE (Internet Key Exchange) initiation message that is sent to the originator of the request via the gateway. Upon receipt of this initiation message, the gateway is then able to set up a two way connection to allow other setup data to flow between the remote and local hosts to complete the setup session and then secure data to flow between the remote and local hosts in a secure communication session, such as in IPSec or VPN session.

32 Claims, 4 Drawing Sheets

OTHER PUBLICATIONS

B. Aboba, "IPsec-Network Address Translation (NAT) Compatibility Requirements", RFC: 3715, Copyright The Internet Society (2004).
S. Kent, "Security Architecture for the Internet Protocol", Nov. 1998, RFC: 2401, Copyright The Internet Society (1998).
W. Simpson, "IP in IP Tunneling", Oct. 1996, RFC: 1853.
J. Touch, "Use of IPsec Transport Mode for Dynamic Routing", Sep. 2004, RFC: 3884, Copyright The Internet Society (2004).
R. Atkinson, IP Encapsulating Security Payload (ESP), Aug. 1995, RFC: 1827.
C. Perkins, "IP Encapsulation within IP", Oct. 1996, RFC: 2003.
International Search Report received in corresponding PCT Application No. PCT/US2006/030164, dated Feb. 9, 2007.
Written Opinion received in corresponding PCT Application No. PCT/US2006/030164, dated Feb. 9, 2007.
Examination Report dated Nov. 30, 2009 for European Patent Application No. 06789235.6. [CISCP444EP].

* cited by examiner

SERVICE FOR NAT TRAVERSAL USING IPSEC

BACKGROUND OF THE INVENTION

The present invention relates to methods and apparatus for processing data within a computer network. More specifically, it relates to using NAT (network address translation) and IPSec (IP Security) protocols for such data.

For a particular computer to communicate with other computers or web servers within a network (e.g., the Internet), the particular computer must have a unique IP (Internet Protocol) address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate IP address that are used outside of the local network. When a local computer attempts to communicate with a computer outside the local network, the intermediary device matches the local computer's local IP address (and port) to one of the intermediary device's assigned IP addresses (and ports). The intermediary device then replaces the local computer's local address (and port) with the matched assigned IP address (and port). This matched assigned IP address (and port) is then used to communicate between the local computer and the outside computer. Thus, NAT techniques allow local IP address to be reused across local networks.

Another solution to the lack of available IP addresses is to redesign the address format to allow for more possible IP addresses. The recent introduction of IPv6 provides 128 bits for the IP address, as compared with IPv4 which provides 32 bits for the IP address. However, until all network devices and computers are converted to IPv6, it is still necessary to allow an existing IPv4 device to communicate with an IPv6 device. One popular method that allows IPv4 to IPv6 communication is referred to as protocol translation (NAT-PT). The IP addresses are converted by NAT-PT from one protocol to another protocol (e.g., IPv4 to IPv6 or vice versa) or, more generally, from an external protocol to an internal protocol. In addition to the IP addresses, the NAT-PT also converts any relevant IPv4 or IPv6 information during a protocol translation.

The basic idea of NAT is to allow multiple users to share one external IP address on the internet. It also provides protection to the internal network, as the IP addresses on the internal network are not visible on the external side. As the number of computers each household has is increasing, most home networks are using NAT. There are also home gateways available which allow IPsec (IP security) or VPN (virtual private network) connections from the outside to the home. The IPSec protocol is generally described in "Security Architecture for the Internet Protocol", RFC 2401, S. Kent et al., Network Working Group of IETF (November 1998), which document is herein incorporated by reference in its entirety.

A VPN emulates a private IP network over public or shared infrastructures. Virtual Private Networks provide advantages to both the service provider and its customers; For its customers, a VPN can extend the IP capabilities of a corporate site to remote offices and/or users with intranet, extranet, and dial-up services. This connectivity may be achieved at a lower cost to the customer with savings in capital equipment, operations, and services. The service provider is able to make better use of its infrastructure and network administration expertise offering IP VPN connectivity and/or services to its customers.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc.

A conventional technique for implementing a VPN across a wide area network may be accomplished through the use of first an IKE (Internet Key Exchange) session to exchange keys and then an IPSec Protocol which establishes a secure IPSec communication session between two nodes. A number of issues arise when attempting to create a secure communication session with a node that sits behind a NAT device. Since the node behind the NAT has a private address, the external node that sits outside the NAT device is not aware of the inside node's address and cannot initiate a secure communication session with such inside node. In some implementations, one may configure the NAT gateway to also terminate the VPN connection and allow access between inside nodes and external nodes. As such, an external node can set up a secure IPSec session with the gateway and thereby have access to all inside nodes. However, this configuration is highly undesirable when the VPN connection is desired end-to-end with a single inside node. By way of example, a remote server may set up a secure connection to the gateway/NAT to deliver pay per view, encrypted movie content to one or more inside subscriber nodes. In this configuration, inside nodes that had not subscribed or paid for the movie content may have unintended access to the movie content as a result of a secure session being set up between the remote server and gateway, but insecure connections within the local network. Moreover, an implementation of a simple connection tracking module on the NAT-enabled gateway does not work for the IPSEC NAT-traversal as IKE+IPSEC do not use predefined ports and the ports to be used are dynamically allocated during handshaking for security reasons. So a connection tracking module which would work for example for protocol http using port 80, would not work for IKE+IPSEC NAT traversal.

A summary of some issues with NAT and IPSec are further discussed in "NAT TRAVERSAL: PEACE AGREEMENT BETWEEN NAT AND IPSEC" by Haluk AyDin, Aug. 12, 2001, published by the SANS Institute of Bethesda, Md. which paper is incorporated herein by reference in its entirety. The following documents also further describe the issues with using NAT and IPSec and are herein incorporated by reference in their entirety: (1) "RSIP Support for End-to-end IPsec", RFC 3104, G. Montenegro et al., Network Working Group of IETF (October 2001), (2) "Security Model with Tunnel-mode IPSec for NAT Domain", RFC 2709, P. Srisuresh et al., Network Working Group of IETF (October 1999), (3) "IPSec-Network Address Translation (NAT) Compatibility Requirements", RFC 3715, B. Aboba et al., Network Working Group of IETF (March 2004).

In view of the above, there is a need for improved mechanisms for reliably and efficiently providing an IPSec connection with a host that resides behind a NAT device.

SUMMARY OF THE INVENTION

The present invention provides methods and apparatus facilitating a secure connection between a first and a second node in a computer network where one or both of the nodes may or may not reside behind a network address translation (NAT) enabled gateway. Embodiments of the present invention provide a seamless integration by providing a uniform solution for establishing secure connections, such as IPSEC, between two nodes irrespective of whether they are behind a NAT-enabled gateway or not. In general, a gateway is operable to receive a request from a remote host for a secure connection to a local host within the home network of the gateway. The gateway then forwards this received request to a NAT traversal service. For example, requests that are received on a predefined port are automatically forwarded to the NAT traversal service. In an alternative example, a local host is specified in the request and the gateway operates to forward the request to a NAT traversal service that is configured in such specified local host. This later approach would be useful in specifying among a plurality of local hosts of a home network. In either case, the NAT traversal service receives the request and then automatically sends an initiation message to set up a secure session, e.g., performing authentication and exchanging keys. In a specific aspect, the setup data utilizes an IKE (Internet Key Exchange) initiation message that is sent to the originator of the request via the gateway. Upon receipt of this initiation message, the gateway is then able to set up a two way connection to allow other setup data to flow between the remote and local hosts to complete the setup session and then secure data to flow between the remote and local hosts in a secure communication session, such as in IPSec or VPN session.

In one embodiment, a method of facilitating a secure communication session between a first node and a second node that resides behind a gateway is disclosed. At the gateway, a request for a secure communication session is received from the first node. At the gateway, the received request for the secure communication session is sent to the second node. The second node is configured to send an initiation message from the second node to the first node via the gateway, and the initiation message is a first message in a setup session for setting up the secure communication session.

In a specific implementation, at the gateway, the initiation message is received; NAT is performed on the initiation message to form a binding between a private address and a public address of the second node, the binding is stored, and the translated initiation message is forwarded to the first node. At the gateway, setup data sent from the first node to the second node and setup data sent from the second node to the first node is continued to be received. The setup data is formatted to set up the secure session. NAT is performed on such received setup data before forwarding it to its intended destination until the setup session is complete. In a specific aspect, the setup data utilizes an IKE (Internet Key Exchange) protocol.

In a further aspect, at the gateway, after the setup session is complete, secure data sent from the first node to the second node and/or secure data sent from the second node to the first node is received. This secure data forms part of the secure session. NAT is performed on such received secure data before forwarding it to its intended destination. In one aspect, the secure data utilizes an IPSec (Internet Protocol Secure) protocol in a tunnel ESP (encapsulating security payload) mode.

In a specific embodiment, the step of sending the request to the second node is only performed for a request that has a destination port equal to a predefined port in an automatic port forwarding procedure. In another embodiment, the request for the secure communication session specifies the second node. The gateway is coupled to a plurality of inside nodes including the second node, and the request is sent to the second node based on the second node being specified by the request.

In another embodiment, a method of facilitating a secure communication session between a first node and a second node that resides behind a gateway is disclosed. At the second node, a request for a secure communication session is received from the first node via the gateway. At the second node, in response to the received request, an initiation message is sent to the first node via the gateway. The initiation message is a first message in a setup session for setting up the secure communication session.

In a further aspect, it is determined whether the received request from the first node is valid prior to sending the initiation message. The initiation message is then only sent to the second node if it is determined that the received request is valid. In another aspect, an error handling procedure is performed if it is determined that the received request is not valid. In a specific implementation, the error handling procedure includes dropping the request or sending an error message to the first node. In another aspect, determining whether the received request is valid includes using a password or certificate.

In another embodiment, the invention pertains to a computer system or apparatus operable to facilitate a secure communication session between a first node and a second node that resides behind a gateway. The computer system includes one or more processors and one or more memory. At least one of the memory and processors are adapted to provide at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
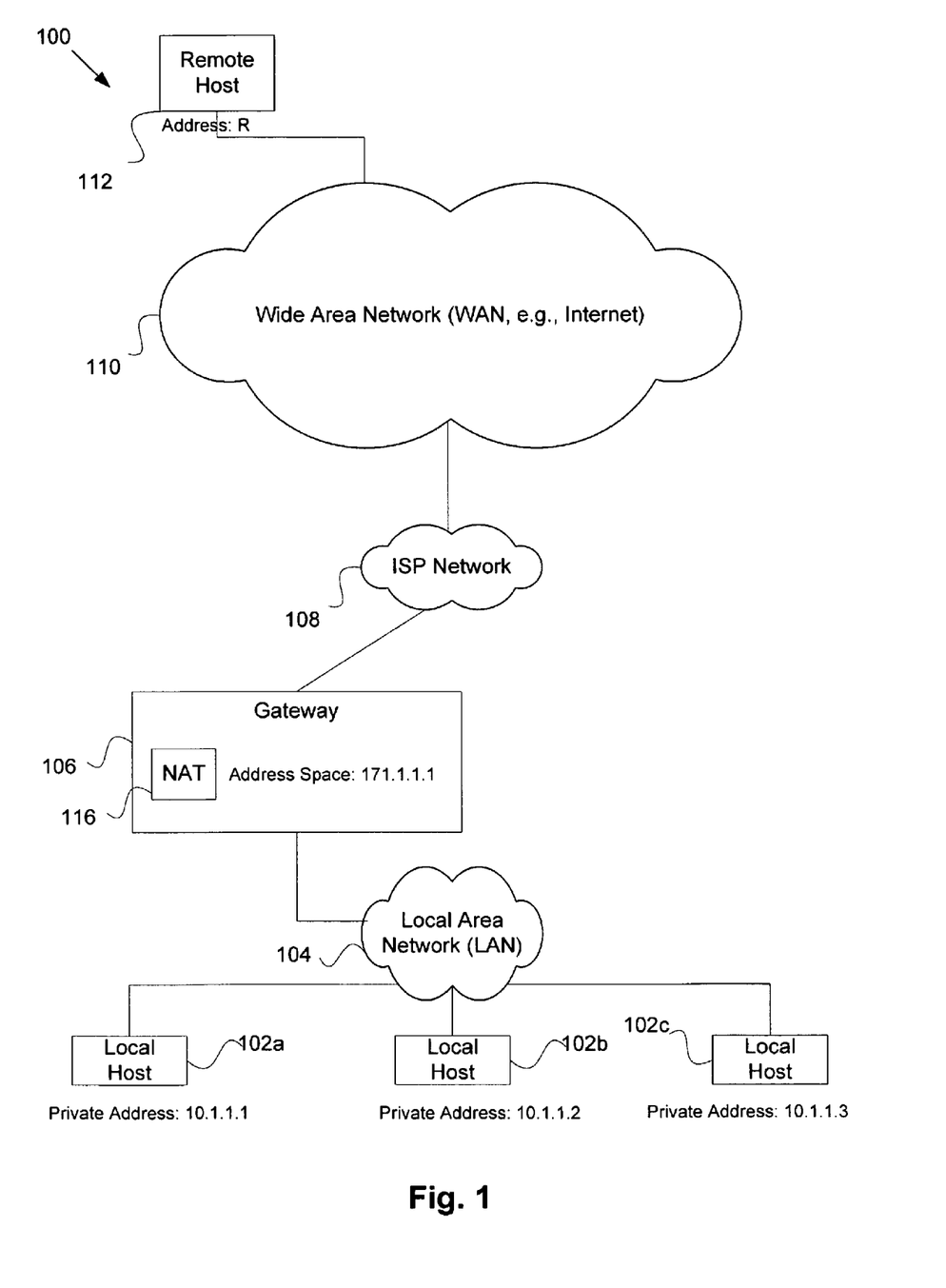
FIG. 1 shows a block diagram of network segment in which techniques of the present invention may be implemented.

FIG. 1 shows a block diagram of network segment 100 in which techniques of the present invention may be implemented. As shown, the network segment 100 includes a local area network (LAN) 104 (also referred to as a home network), gateway 106, local hosts 102a~102c, and remote host 112. The gateway and/or hosts may communicate via any suitable link or set of links. The link(s) may be any suitable media such as coaxial cable, shielded and unshielded twisted pair wiring, fiber optic line, radio channels, and the like. The hosts will typically also reside in a LAN (local area network). This LAN may assume a variety of topologies, including ring, bus, star, etc. Further, these LANs may have different physical configurations such as token ring (IEEE 802.5), ethernet (IEEE 802.3), and fiber distributed data interface or "FDDI" (ANSI X3T9.5). Each host may also belong to a different VLAN (Virtual LAN).

Each of the local hosts 102 may communicate with a remote host, e.g., remote host 112, via a gateway 106 and a wide area network (WAN) 110, such as the Internet. Although not shown for all devices (e.g., remote host 112), each device typically communicates with other devices via one or more network devices, such as gateways and routers.

In general, gateway 106 includes a NAT mechanism 116 for translating between private and public addresses (or ports) associated with its local hosts. Gateway 106 may also be associated with a particular Internet Service Providers (ISP), such as ISP 108. Gateway 106 and its ISP 108 utilize public address space 171.1.1.1~171.x.x.x, for example. This public address space may be used by the NAT 116 to translate data exiting the home network from a local node's private address into a temporary public address, such as 171.1.1.2, and visa versa for data returned to the same local node.

Each local client device 102 attached to the local network 104 is assigned a unique local IP address using a private addressing scheme specific to the LAN 104. As shown, host 102a is assigned private address "10.1.1.1"; host 102b is assigned private address "10.1.1.2"; host 102c is assigned private address "10.1.1.3". In contrast, remote host 112 utilizes public address "R". For example, NAT 116 may translate the private address 10.1.1.1 to public address 171.1.1.3 for data exiting and entering the home network for local host 102a. Although not shown, remote host 112 may also be coupled with its own home network and reside behind a gateway and, accordingly, have a private address for its home network.

Hosts (for example, workstations, users and/or data center servers) using the IP protocol generally are configured to utilize a default gateway to exit a local network and access remote networks and hosts. Therefore, each host has prior knowledge of the gateway's IP address which typically is a router or layer-3 switch IP address. Hosts are either statically configured with the IP address of the default gateway or are assigned the address through a configuration protocol (such as Dynamic Host Configuration Protocol or DHCP) upon boot-up. In either case, the host uses the same default gateway IP address for all network traffic destined to exit the local network. Thus, each host knows its own default gateway IP address. The host can know the IP address of the other node's gateway by either preconfiguration or using Dynamic Domain Name Service (DDNS) lookup.

In general, the present invention includes mechanisms for facilitating a secure session with a host that resides behind a NAT-enabled gateway. NAT may include any suitable combination of mechanisms for translating between private and public IP addresses, private and public UDP ports, and IPv4 and IPv6 protocols. Although these inventive techniques are described in terms of a remote host communicating with a local node on a home network that resides behind a NAT-enabled gateway, of course, the remote host may also reside behind such a NAT-enabled gateway on its own local network. For simplicity, setting up a secure session is only described with respect to a single NAT-enabled gateway although this setup procedure may be applied to any number of NAT-enabled gateways which may be traversed during a secure communication session between any suitable number and type of nodes, hosts, servers, or the like.

A secure session may be set up between two nodes using any suitable protocol for setting up a secure communication session, such as IKE (Internet Key Exchange). IKE establishes a shared security policy and authenticates keys for secure services (such as IPSec) that require keys. Before any secure traffic can be passed, each endpoint ideally verifies the identity of its peer. This can be done through techniques such as pre-shared keys or using certificates. A CA (certificate authority) is an example entity that issues digital certificates (such as X.509 certificates) and vouches for the binding between the data items in a certificate. After trust is established and keys are exchanged through any suitable secure setup protocol such as IKE, a secure communication protocol such as IPSec may then be used to encrypt data using the key(s) obtained during the IKE communication.

When an inside node resides behind a NAT-enabled gateway and one wishes to establish a secure communication session, such as an IPSec session, with such inside node, setting up the secure session through the NAT-enabled gateway may be difficult and in some cases impossible. First, one may not be aware of the private address of the inside node, have no way of obtaining an address for the inside node, and, therefore, have no way to reach such inside node. Second, packets destined for private local addresses cannot be routed. Third, even if they could be routed, when a request is initially sent from a remote host that is external to the NAT-enabled gateway, such request is typically not trusted by the NAT-enabled gateway. Most gateways have a firewall enabled, which discards requests from outside nodes to inside local nodes. Even if the gateway where to disable the firewall and allow all outside node requests to be forwarded, when the first initiation message is from outside, the gateway does not have a binding configuration entry to the local node and hence is not able to forward packets to a particular inside local host. Thus, the remote host is not allowed to initiate communication with a host that resides behind a NAT-enabled gateway.

However, under certain conditions the NAT-enabled gateway will allow data or requests to pass through from a remote host to an inside host. For example, when a service request is initiated from an inside requesting host to an external server, the NAT-enabled gateway assumes that the inside node is trustworthy and, accordingly, allows data to pass from the inside node through to a remote server. When the remote server then returns a response to the local host's request, the NAT-enabled gateway then automatically allows the response returned from the external server to pass through to the inside service requesting host. That is, the NAT-enabled gateway assumes that the inside nodes are always safe and that any response's to an inside node's request is also trustworthy.

Figure 2:
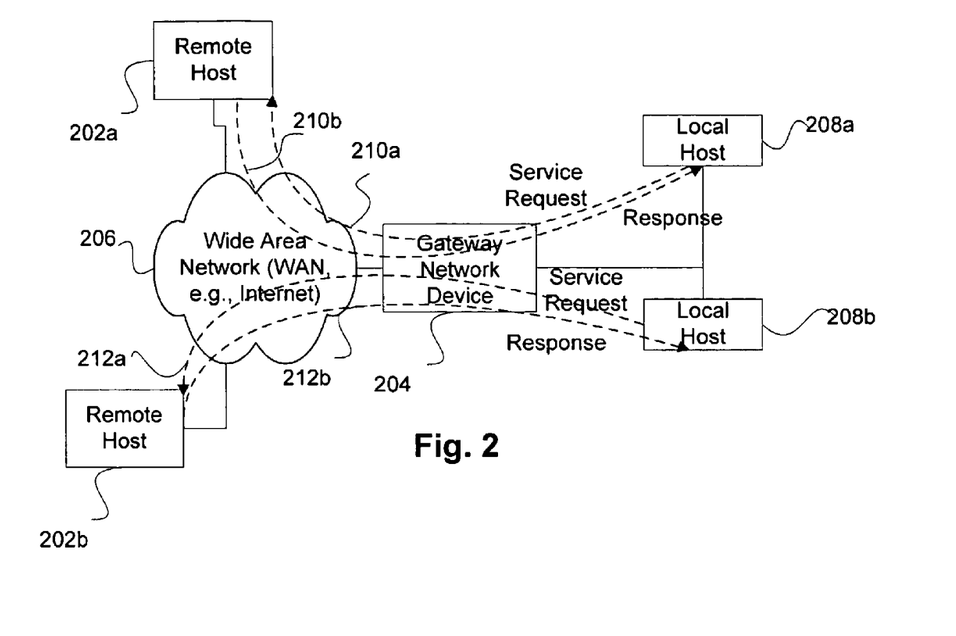
FIG. 2 is a diagrammatic representation of a home network with multiple hosts accessing multiple remote servers through a gateway network device.

As shown in FIG. 2, local host 208a sends a service request, such as a service request 210a for a movie trailer, via NAT-enabled gateway 204 and WAN 206 to remote server 202a. The NAT-enabled gateway 204 is configured to note the request 210a as emanating from local host 208a and being destined to remote server 202a and thereby set up a pinhole for any responses returned to local host 208a from the remote server 202a. Thus, when a response 210b is received into the NAT-enabled gateway 204 from remote server 202a in response to the request 210a, the NAT-enabled gateway 202a allows the response to 210b to reach local host 208a. Likewise, when a request 212a, such as a request for a downloadable MP3 song, is sent by local host 208b to remote server 202b, the NAT-enabled gateway 204 automatically allows the response 212b from remote server 202b to pass to local host 208b.

Embodiments of the present invention take advantage of this characteristic of the NAT-enabled gateway in order to provide a secure session between two nodes, where at least one of the nodes resides behind a NAT-enabled gateway. When a secure session is desired between two nodes and one of the nodes is an inside node that resides behind a NAT-enabled gateway, the secure session is set up by automatically sending an initiation message for setting up a secure session from the inside node to the outside node via the NAT-enabled gateway. The initiation message may take any suitable format, such as an IKE initiation message, for initiating setup of a secure communication session, where the setup may include verification and/or key exchange procedures. This initiation message may be triggered by any suitable event, such as a remote host sending a request for a secure session with an inside node, or visa versa. After an inside host automatically sends such a initiation message through the NAT-enabled gateway, the NAT-enabled gateway then automatically trusts and forwards responses to the initiation message from the outside remote host to the requesting inside node. A secure communication session may then commence between the remote host and the inside node undeterred by the NAT-enabled gateway.

Figure 3:
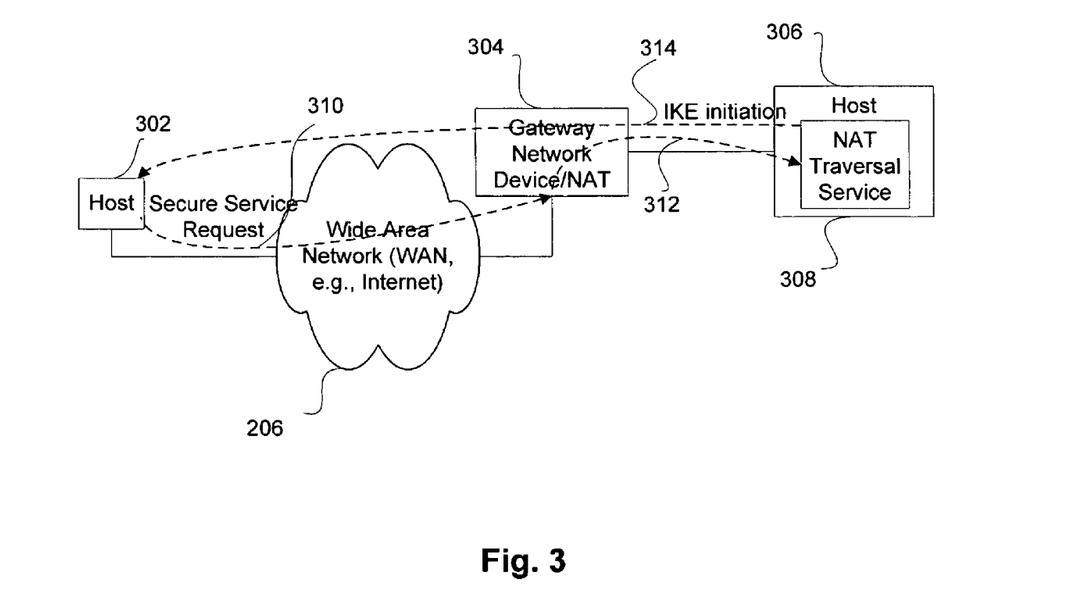
FIG. 3 is a diagrammatic representation of a network segment in which a secure connection is facilitated between a first host and a second host that resides behind a NAT device in accordance with one embodiment of the present invention.
Figure 4:
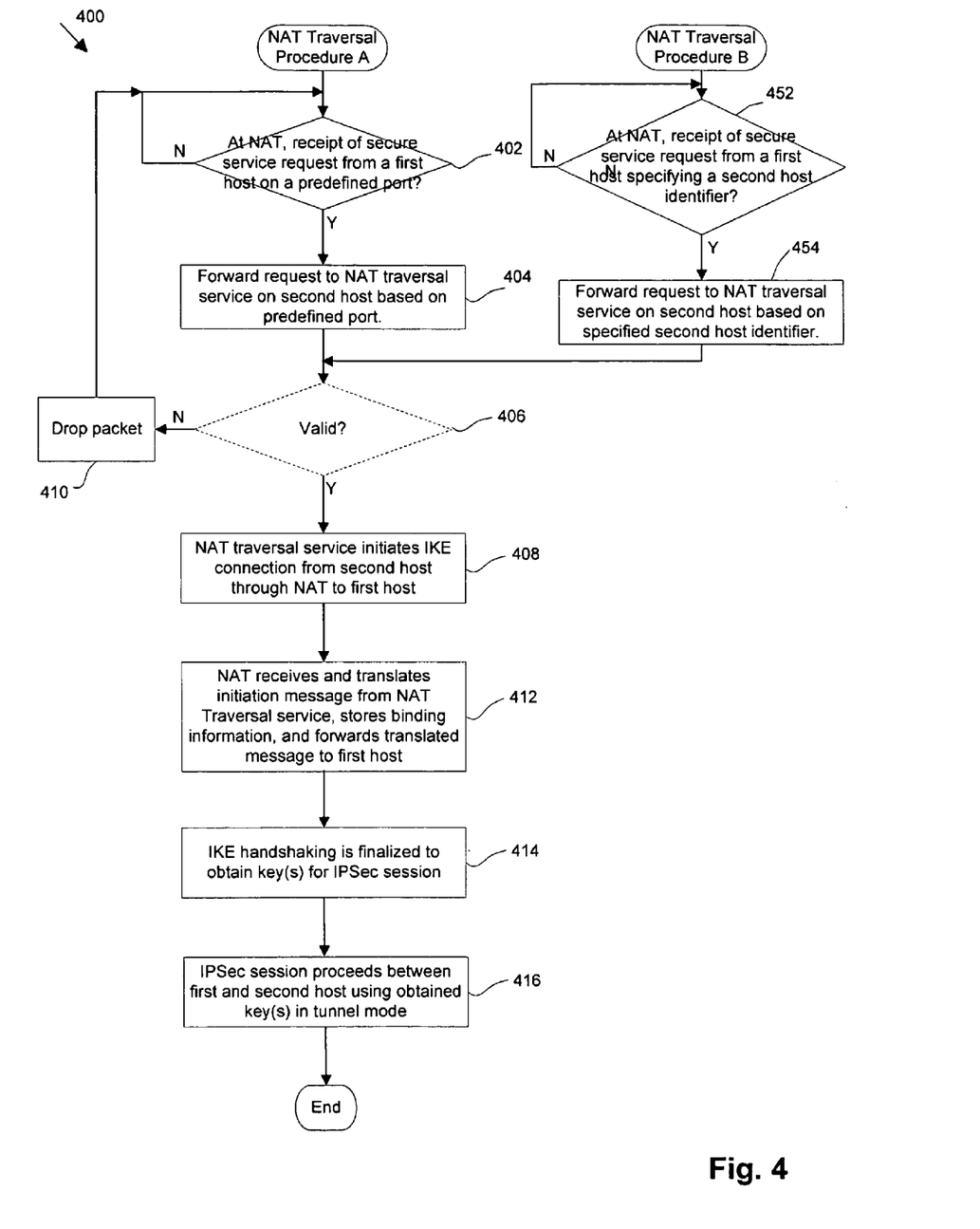
FIG. 4 is a flow chart illustrating a procedure for facilitating the setup of a secure connection between a first host and a second host that resides behind a NAT device in accordance with a first implementation of the present invention.

FIGS. 3 and 4 will be used to describe an implementation of the present invention. Initially, as shown in FIG. 3, a first host 302 sends a secure service request 310 to NAT-enabled gateway 304. A NAT Traversal Procedure A and a NAT Traversal Procedure B are both represented in FIG. 4 for handling two different scenarios. In Procedure A, the secure service request 310 is being sent to a predefined port and the private node may or may not be specified in the request 310. In Procedure B, the inside node is specified in the request 310. Procedure B may be used for reaching a specific node that resides behind a NAT device that is coupled to multiple nodes without requiring prior port mapping, while Procedure A does not require the gateway to interpret the contents of the request.

In Procedure A, at the NAT-enabled gateway 304 it is determined whether a secure service request 310 from a first host 302 has been received on the predefined port in operation 402. A request may be identified as a "secure" service request by any suitable manner. For example, the request may be a secure URL request in the form of https://<destination><content>, where the "https" portion indicates that this is a secure connection request. The request may also include any suitable flag for indicating that this is a request for a secure communication session or that the procedures of the present invention should be initiated with respect to the received request. In another example, different ports may be predefined to map to different local hosts. For example local host A may be listening on port 1234 and local host B may listen on port 1235.

If receipt of such a request has occurred, the NAT-enabled gateway 304 then forwards the request to a NAT traversal service 308 on a second host 306 based on the predefined port in operation 404. That is, port forwarding is implemented. Port forwarding includes forwarding one or more predefined ports to a particular destination, such as the NAT traversal service 308 on the second host 306. The one or more predefined ports may be preconfigured in the NAT-enabled gateway 304 so that all data received on such preconfigured ports into the NAT-enabled gateway 304 are automatically forwarded to a specified location, such as the NAT traversal service 308 on the second host 306.

In Procedure B, the NAT-enabled gateway 304 waits for a service request from a first host that specifies a second host identifier in operation 452. In this scenario, the first host 302 is aware of an identifier of the second host and uses that identifier in its request to specify the second host 306. If multiple inside hosts reside behind a NAT-enabled gateway, a remote host may access any number of such inside hosts if they have knowledge of the inside nodes' identifiers. In one implementation, the second host's private address, hostname or identifier is given to the originator of the service request from the first host, for example, by a user of the second node. The identifier of the second host 306 may be used in the secure service request 310 sent by the first host 302 in any suitable manner. For example, the identifier may be in the form of the private address of the second host 306 and used within the contents of the request 310. After receipt of a service request specifying the second host, the request 310 is forwarded to the NAT traversal service 308 of the second host 306 based on the specified host identifier in operation 454.

Thus, if there is more than one inside node, any suitable inside node may be specified in the secure service request sent by a remote host to the NAT-enabled gateway of such inside nodes. That is, the secure service request will be forwarded to the appropriate inside node based on the specified inside node identifier. For the example of FIG. 1, service requests that specify an identifier for host 102a are forwarded to a NAT traversal service (not shown) on host 102a; service requests that specify an identifier for host 102b are forwarded to a NAT traversal service (not shown) on host 102b; service requests that specify an identifier for host 102c are forwarded to a NAT traversal service (not shown) on host 102c. In this implementation, each available inside node is configured with its own NAT traversal service (not shown).

After a secure service request is received by a NAT traversal service in either procedure A or B, it may then be determined whether the service request is valid in operation 406. That is, the request can contain verifiable proof of the request sender's identity and this proof is verified as valid or invalid in step 406. If the request is not valid, the packet may dropped in operation 410 or any other suitable error mechanisms may implemented, such as sending of an error message to the request sender. The validation steps 406 and 410 are optional steps and may be skipped. For instance, the sender of the request may be authenticated by an authentication technique, such as using a predefined password or certificate in the secure service request. If the request is found to be valid, the procedure 400 continues.

The NAT traversal service 308 then initiates an IKE connection (or any other suitable setup session for setting up a secure connection) from the second host 306 to the first host 302 via NAT-enabled gateway 304 in operation 408. The NAT-enabled gateway receives the initiation IKE message from the NAT traversal service, translates this received initiation IKE message, stores binding information for the private and public address of the second host (as well as other parameters regarding the specific protocol and service), and forwards the translated initiation IKE message to the first host in operation 412. For example, binding information is stored in a NAT table, and possibly a session table. This binding information will be used later to allow other messages back through from the first host to the second host.

The IKE handshaking session is then finalized to obtain one or more keys for an IPSec session between the first and second hosts in operation 414. This IKE handshaking may contain any suitable techniques for exchanging one or more keys as well as authentication procedures, such as using a digital certificate or a pre-shared secret, e.g., password. An IPSec session may then proceed between the first and second hosts using the obtained keys and tunnel ESP (encapsulating security payload) mode in operation 416. In tunnel ESP mode, the payload is encrypted and the data is encapsulated with an ESP header and a new IP header, but a checksum of the IP header and payload is not determined and placed in each packet. During authentication of the received packet, the header is not authenticated since AH (authenticate header) mode is not used nor is a checksum verified since a transparent mode is not used. Thus, the translation of the IP header by the NAT-enabled gateway does not adversely affect the authentication of the received packet.

Data sent from the remote host to the local host will be received first by the NAT-enabled gateway and contain a public destination address for the local host, which was assigned by the NAT-enabled gateway during translation of the initiation IKE message. This public destination address for the local host will be translated into the local host's private address based on the stored binding information, and the translated data will then be forwarded from the NAT-enabled gateway to the local host. Data transmitted from the local host to the remote host during the IPSec session will also be translated so that the private source address of the local host is translated into the corresponding public address for such local host based on the stored binding information.

Embodiments of the present invention have several associated advantages. For example, since the IPSec or VPN connection is terminated from the outside to the inside node rather than the NAT-enabled gateway, the outside node is denied access to any other inside nodes. That is, an outside node will not have access to an entire home network. Additionally, since the initiation IKE message is sent from the trusted inside node to an outside node, the NAT-enabled gateway will automatically allow access to responses sent by the outside node to the originating inside node. Additionally, since protocols such as IKE allow simultaneous initiation, the connection will work no matter which order the initiation packets arrive at each end and, therefore, this technique works even if both nodes are behind separate NAT-enabled gateways. Finally, the techniques of this invention allow use of NAT and IPsec without the need for an additional NAT traversal technique, where private addresses of each end node are obtained prior to the secure communication session.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. and NAT-enabled home gateways available from Linksys of Irvine, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 5:
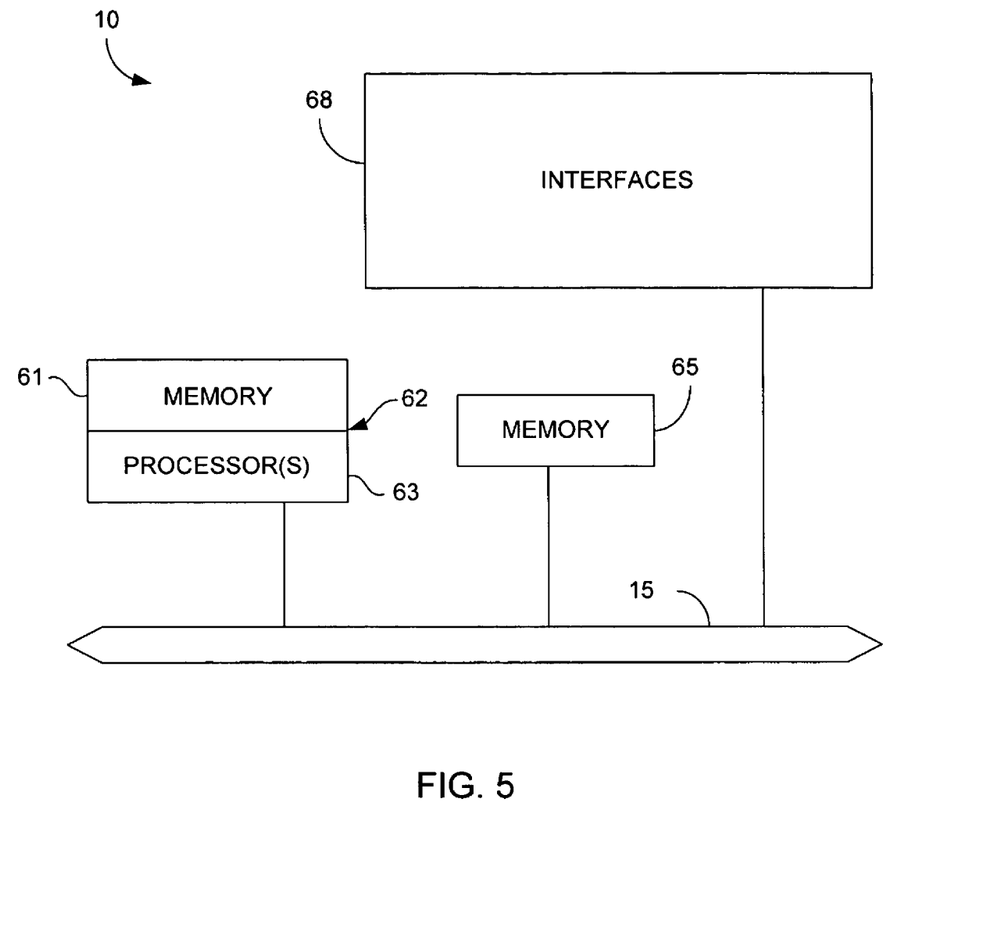
FIG. 5 is a block diagram of a computer system that may be used to implement embodiments of this invention.

Referring now to FIG. 5, a computer system 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such router tasks as routing table computations and network management. It may also be responsible for calculating a route metric and/or comparing two route metrics to determine which has higher priority. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of computer system 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the computer system 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 is one specific computer system of the present invention, it is by no means the only computer system architecture on which the present invention can be implemented. For example, an architecture having a single processor that handles communications as well as routing computations, etc. is often used. Further, other types of interfaces and media could also be used with the computer system.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received messages, a NAT Table, a Session Table, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, multiple hosts may reside behind a single gateway (e.g., a NAT-enabled gateway) and be accessible by different remote hosts that are outside the gateway. A single local host may also be simultaneously accessed by multiple remote hosts and/or allow simultaneous multiple secure connections. Therefore, the described embodiments should be taken as illustrative and not restrictive, and the invention should not be limited to the details given herein but should be defined by the following claims and their full scope of equivalents.

What is claimed is:

1. A method of facilitating a secure communication session between a first node and a second node the method comprising:
   (a) at a gateway, receiving a first request for a secure communication session with the second node from the first node that does not reside behind the gateway, wherein the second node does reside behind the gateway, and wherein the first request specifies an initiation of the secure communication session by the first node;
   (b) at the gateway, sending the first request to a Network Address Translation (NAT) traversal service associated with the second node, wherein the NAT traversal service associated with the second node is configured to, in response to the first request, send from the NAT traversal service a second request to the first node via the gateway, wherein the second request specifies an initiation of the secure communication session by the second node instead of the first node;
   (c) at the gateway, receiving the second request from the NAT traversal service associated with the second node; and
   (d) at the gateway, forming a pinhole based on the second request so as to allow responses received in response to the second request from the first node to reach the second node via the gateway.

2. The method as recited in claim 1, further comprising:
   at the gateway, performing NAT on the second request so as to (i) translate a private address of the second node to a public address of the second node, (ii) form a binding between the private address and the public address of the second node, and (iii) store the binding;
   at the gateway, forwarding the translated second request to the first node; and
   at the gateway, continuing to receive setup data sent from the first node to the second node and setup data sent from the second node to the first node, wherein the setup data is formatted to set up the secure session, and wherein NAT is performed on such received setup data based on the binding before forwarding it to its intended destination until the setup session is complete.

3. The method as recited in claim 2, wherein the second request and the setup data utilizes an IKE (Internet Key Exchange) protocol.

4. The method as recited in claim 2, further comprising:
   at the gateway, after the setup session is complete, receiving secure data sent from the first node to the second node and/or secure data sent from the second node to the first node, wherein the secure data forms part of the secure session, and wherein NAT is performed on such received secure data based on the binding before forwarding it to its intended destination.

5. The method as recited in claim 4, wherein the secure data utilizes an IPSec (Internet Protocol Secure) protocol in a tunnel ESP (encapsulating security payload) mode so that the secure data does not contain a checksum of a header and payload of the secure data.

6. The method as recited in claim 1, wherein the step of sending the first request to the NAT traversal service associated with the second node is only performed for a request that has a destination port equal to a predefined port in an automatic port forwarding procedure that is mapped to the second node.

7. The method as recited in claim 1, wherein the first request for the secure communication session specifies the second node, and wherein the gateway is coupled to a plurality of inside nodes including the second node, and the first request is sent to the NAT traversal service associated with the second node based on the second node being specified by the first request.

8. The method as recited in claim 1, wherein steps (a) through (d) are repeated for a plurality of first requests from a plurality of different nodes that reside outside the gateway and wherein the first requests are then sent to a plurality of different NAT traversal services associated with a plurality of different nodes that are behind the gateway.

9. The method as recited in claim 1, wherein steps (a) through (d) are repeated for a plurality of first requests from a plurality of different nodes that reside outside the gateway and wherein the first requests are sent to the NAT traversal service associated with the second node.

10. A gateway network device operable to facilitate a secure communication session between a first node and a second node, the network device comprising:

one or more processors;
one or more memory, wherein at least one of the processors and the memory are configured for:
(a) receiving a first request for a secure communication session with the second node from the first node that does not reside behind the gateway, wherein the second node does reside behind the gateway, and wherein the first request specifies an initiation of the secure communication session by the first node;
(b) sending the first request to a Network Address Translation (NAT) traversal service associated with the second node, wherein the NAT traversal service associated with the second node is configured to, in response to the first request, send from the NAT traversal service a second request to the first node via the gateway wherein the second request specifies an initiation of the secure communication session by the second node instead of the first node;
(c) receiving the second request from the NAT traversal service associated with the second node; and
(d) forming a pinhole based on the second request so as to allow responses received in response to the second request from the first node to reach the second node via the gateway.

11. The network device as recited in claim 10, wherein the at least one of the processors and memory are further configured for:
at the gateway, performing NAT on the second request so as to (i) translate a private address of the second node to a public address of the second node, (ii) form a binding between the private address and the public address of the second node, and (iii) store the binding;
at the gateway, forwarding the translated second request to the first node; and
continuing to receive setup data sent from the first node to the second node and setup data sent from the second node to the first node, wherein the setup data is formatted to set up the secure session, and wherein NAT is performed on such received setup data based on the binding before forwarding it to its intended destination until the setup session is complete.

12. The network device as recited in claim 11, wherein second request and the the setup data utilizes an IKE (Internet Key Exchange) protocol.

13. The network device as recited in claim 11, wherein the at least one of the processors and memory are further configured for:
after the setup session is complete, receiving secure data sent from the first node to the second node and/or secure data sent from the second node to the first node, wherein the secure data forms part of the secure session, and wherein NAT is performed on such received secure data Previously presented before forwarding it to its intended destination.

14. The network device as recited in claim 13, wherein the secure data utilizes an IPSec (Internet Protocol Secure) protocol in a tunnel ESP (encapsulating security payload) mode so that the secure data does not contain a checksum of a header and payload of the secure data.

15. The network device as recited in claim 10, wherein the at least one of the processors and memory are further configured for sending the first request to the NAT traversal service associated with the second node only for a request that has a destination port equal to a predefined port in an automatic port forwarding procedure that is mapped to the second node.

16. The network device as recited in claim 10, wherein the first request for the secure communication session specifies the second node, and wherein the gateway is coupled to a plurality of inside nodes including the second node, and the first request is sent to the NAT traversal service associated with the second node based on the second node being specified by the first request.

17. The network device as recited in claim 10, wherein the at least one of the processors and memory are further configured for repeating steps (a) through (d) for a plurality of first requests from a plurality of different nodes that reside outside the gateway and wherein the first requests are then sent to a plurality of different NAT traversal services associated with a plurality of different nodes that are behind the gateway.

18. The network device as recited in claim 10, wherein the at least one of the processors and memory are further configured for repeating steps (a) through (d) for a plurality of first requests from a plurality of different nodes that reside outside the gateway and wherein the first requests are sent to the NAT traversal service associated with the second node.

19. An apparatus for facilitating a secure communication session between a first node and a second node, the apparatus comprising:
means for performing network address translation (NAT);
means for receiving a first request for a secure communication session with the second node from the first node that does not reside behind the apparatus, wherein the second node does reside behind the apparatus, and wherein the first request specifies an initiation of the secure communication session by the first node;
means for sending the first request to a Network Address Translation (NAT) traversal service associated with the second node, wherein the NAT traversal service associated with the second node is configured to, in response to the first request, send from the NAT traversal service a second request to the first node via the gateway, wherein the second request specifies an initiation of the secure communication session by the second node instead of the first node;
means for receiving the second request from the NAT traversal service associated with the second node; and
means for forming a pinhole based on the second request so as to allow responses received in response to the second request from the first node to reach the second node via the gateway.

20. A method of facilitating a secure communication session between a first node and a second node via a gateway, the method comprising:
receiving a first request for a secure communication session with the second node from the first node that does not reside behind the gateway, wherein the second node does reside behind the gateway, and wherein the first request specifies an initiation of the secure communication session by the first node; and
in response to the first request, sending a second request to the first node via the gateway so as to cause the gateway to form a pinhole based on the second request so as to allow responses received in response to the second request from the first node to reach the second node via the gateway, wherein the second request specifies an initiation of the secure communication session by the second node instead of the first node.

21. The method as recited in claim 20, further comprising:
determining whether the first request from the first node is valid prior to sending the second request; and
only sending the second request to the first node if it is determined that the first request is valid.

22. The method as recited in claim 21, further comprising performing an error handling procedure if it is determined that the first request is not valid.

23. The method as recited in claim 22, wherein the error handling procedure includes dropping the first request or sending an error message to the first node.

24. The method as recited in claim 21, wherein determining whether the first request is valid includes using a password or certificate.

25. The method as recited claim 21, wherein the gateway is a network address translation enabled gateway.

26. A computer system operable to facilitate a secure communication session between a first node and a second node via a gateway the computer system comprising:
   one or more processors;
   one or more memory, wherein at least one of the processors and the memory are configured with a NAT traversal service that is configured for:
      receiving a first request for a secure communication session with the second node from the first node that does not reside behind the gateway, wherein the second node does reside behind the gateway, and wherein the first request specifies an initiation of the secure communication session by the first node; and
      in response to the first request, sending a second request to the first node via the gateway so as to cause the gateway to form a pinhole based on the second request so as to allow responses received in response to the second request from the first node to reach the second node via the gateway, wherein the second request specifies an initiation of the secure communication session by the second node instead of the first node.

27. The computer system as recited in claim 26, wherein the NAT traversal service is further configured for:
   determining whether the first request from the first node is valid prior to sending the second request; and
   only sending the second request to the first node if it is determined that the first request is valid.

28. The computer system as recited in claim 27, wherein the NAT traversal service is further configured for performing an error handling procedure when it is determined that the first request is not valid.

29. The computer system as recited in claim 28, wherein the error handling procedure includes dropping the first request or sending an error message to the first node.

30. The computer system as recited in claim 27, wherein determining whether the first request is valid includes using a password or certificate.

31. The computer system as recited claim 28, wherein the gateway is a network address translation enabled gateway.

32. An apparatus for facilitating a secure communication session between a first node and a second node, the apparatus comprising:
   means for receiving a first request for a secure communication session with the second node from the first node that does not reside behind a gateway, wherein the second node does reside behind the gateway, and wherein the first request specifies an initiation of the secure communication session by the first node; and
   means for, in response to the first request, sending a second request to the first node via the gateway so as to cause the gateway to form a pinhole based on the second request so as to allow responses received in response to the second request from the first node to reach the second node via the gateway, wherein the second request specifies an initiation of the secure communication session by the second node instead of the first node.

* * * * *